United States Patent
Jung et al.

(10) Patent No.: US 11,112,828 B2
(45) Date of Patent: Sep. 7, 2021

(54) ELECTRONIC DEVICE INCLUDING CONTACT MEMBER AND MANUFACTURING METHOD OF THE SAME

(71) Applicant: Samsung Electronics Co., Ltd., Gyeonggi-do (KR)

(72) Inventors: Tae Hwa Jung, Gyeonggi-do (KR); Young Kyu Kim, Gyeonggi-do (KR); Young Moon Park, Gyeonggi-do (KR); Jae Uk Ahn, Gyeonggi-do (KR); Jong Chun Wee, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/221,730

(22) Filed: Dec. 17, 2018

(65) Prior Publication Data
US 2019/0196412 A1 Jun. 27, 2019

(30) Foreign Application Priority Data
Dec. 22, 2017 (KR) .......................... 10-2017-0177992

(51) Int. Cl.
*G06F 1/16* (2006.01)
*G04G 17/08* (2006.01)
(Continued)

(52) U.S. Cl.
CPC ........... *G06F 1/163* (2013.01); *G04G 9/0064* (2013.01); *G04G 17/08* (2013.01); *G04G 21/00* (2013.01)

(58) Field of Classification Search
CPC ........ G06F 1/163; G04G 17/08; G04G 21/00; G04G 9/0064; G04G 17/04; G04G 21/04; G04G 21/025
See application file for complete search history.

(56) References Cited

U.S. PATENT DOCUMENTS

| 5,746,607 A | * | 5/1998 | Bricaud et al. | ...... H01R 12/714 439/66 |
| 7,611,391 B2 | * | 11/2009 | Long | .................. H01R 13/2442 439/500 |

(Continued)

FOREIGN PATENT DOCUMENTS

| CN | 202262122 U | 5/2012 |
| CN | 103092261 A | 5/2013 |

(Continued)

OTHER PUBLICATIONS

International Search Report dated Mar. 20, 2019.
European Search Report dated Oct. 19, 2020.
Chinese Search Report dated Mar. 2, 2021.

*Primary Examiner* — Hung S. Bui
*Assistant Examiner* — Sagar Shrestha
(74) *Attorney, Agent, or Firm* — Cha & Reiter, LLC.

(57) ABSTRACT

According to certain embodiments of the present disclosure, an electronic device and manufacturing method are disclosed. The electronic device includes: a housing including a first face, a second face, and a side member surrounding a space defined between the first face and the second face, a support member within the housing such that a side face of the support member is oriented towards an inner wall of the side member, a circuit board mounted on one face of the support member, an electrically conductive plate mounted on a second face, and a contact member mounted on the support member to electrically couple at least a portion of the side member to the circuit board, wherein the contact member includes an end portion adjacent to the plate, and an end face of the end portion includes a width smaller than a width of another portion of the contact member.

15 Claims, 17 Drawing Sheets

(51) Int. Cl.
*G04G 9/00* (2006.01)
*G04G 21/00* (2010.01)

(56) References Cited

U.S. PATENT DOCUMENTS

| | | | | |
|---|---|---|---|---|
| 10,103,461 | B2* | 10/2018 | Yokoo | H01R 13/24 |
| 10,199,756 | B2* | 2/2019 | Ju | H01R 12/7076 |
| 10,608,323 | B2* | 3/2020 | Choi et al. | H01Q 1/243 343/718 |
| 2004/0161979 | A1* | 8/2004 | Kyowski | H01R 11/282 439/660 |
| 2005/0020098 | A1* | 1/2005 | Ramey | H01R 12/52 439/66 |
| 2008/0001832 | A1 | 1/2008 | Murakami et al. | |
| 2010/0112964 | A1 | 5/2010 | Yi et al. | |
| 2010/0173506 | A1* | 7/2010 | Adachi | H01R 12/714 439/66 |
| 2013/0181873 | A1 | 7/2013 | Gutschenritter et al. | |
| 2014/0086026 | A1 | 3/2014 | Mitani et al. | |
| 2014/0286523 | A1 | 9/2014 | Yeh et al. | |
| 2015/0378321 | A1 | 12/2015 | Fraser et al. | |
| 2016/0018856 | A1* | 1/2016 | Heo | H05K 9/0064 361/679.55 |
| 2016/0064804 | A1* | 3/2016 | Kim | H01Q 7/00 343/702 |
| 2016/0254587 | A1* | 9/2016 | Jung et al. | H01Q 1/22 343/702 |
| 2016/0255733 | A1* | 9/2016 | Jung | G04B 37/225 361/759 |
| 2016/0374219 | A1 | 12/2016 | Park | |
| 2017/0045916 | A1* | 2/2017 | Kim | G06F 1/1643 |
| 2018/0129170 | A1* | 5/2018 | Yun | H01Q 1/243 |
| 2018/0331442 | A1* | 11/2018 | Huang | H01R 13/2407 |
| 2019/0103330 | A1* | 4/2019 | Ishibashi | H01L 23/24 |
| 2019/0273336 | A1* | 9/2019 | Lee | H01R 12/712 |

FOREIGN PATENT DOCUMENTS

| | | |
|---|---|---|
| CN | 104063021 A | 9/2014 |
| CN | 103092261 B | 6/2016 |
| CN | 205752546 U | 11/2016 |
| CN | 106257896 A | 12/2016 |
| CN | 206379467 U | 8/2017 |
| CN | 107340709 A | 11/2017 |
| EP | 0 608 734 A2 | 8/1994 |

* cited by examiner

ELECTRONIC DEVICE INCLUDING CONTACT MEMBER AND MANUFACTURING METHOD OF THE SAME

CROSS-REFERENCE TO RELATED APPLICATION

This application claims the priority under 35 U.S.C. § 119(a) to Korean Patent Application Serial No. 10-2017-0177992, which was filed in the Korean Intellectual Property Office on Dec. 22, 2017, the entire content of which is hereby incorporated by reference.

BACKGROUND

1. Field

Certain embodiments relate to an electronic device, and more particularly, to an electronic device including a contact member.

2. Description of the Related Art

Electronic devices refer to devices that perform a specific function according to a program provided therein, and may include an electronic scheduler, a portable multimedia reproducer, a mobile communication terminal, a tablet PC, an image/sound device, a desktop/laptop PC, or a vehicular navigation system, or a home appliance. As electronic devices increase in integration, super-high speed and large capacity wireless communication has become more popular, resulting in increased provision of diverse functions in a single electronic device, such as a mobile communication terminal. For example, various functions, such as entertainment functions (e.g., a game function), multimedia functions (e.g., a music/video reproducing function), communication and security functions for mobile banking, schedule management functions, and an e-wallet function, are integrated in a single electronic device, in addition to communication functions.

With the development of electronic and communication technologies, electronic devices have become smaller and lighter, so they can be used conveniently even when worn on a body. For example, electronic devices, such as wristwatch-type electronic devices or glasses-type electronic devices, which can be carried and used by a user while being worn on the user's body, have been commercialized. As the electronic devices have become smaller and the functions provided therein have become more diverse, the assembling structures of the electronic devices may become more complicated and finer. For example, in order for an electronic device to perform wireless communication, an antenna device including a radiating conductor and the like may be connected to a communication module. However, the space for a radiating conductor arrangement, a wiring structure for connecting a radiating conductor to the communication module, or the like may become considerably finer.

SUMMARY

However, as electronic devices become smaller and lighter, it may be difficult to secure the space for arranging a radiating conductor and to design a wiring structure to be connected to a communication module. In certain embodiments, a radiating conductor structure may be secured by forming a part of a housing that forms the outer appearance of the electronic device from an electrically conductive material and connecting it to the communication module. However, there is still difficulty in manufacturing and installing a wire or contact structure for connecting the radiating conductor and the communication module. For example, in the case of a miniaturized device such as a body-worn-type electronic device, a contact structure is small and difficult to assemble, and a visual inspection or the like may be performed to determine whether the assembly is defective or not.

Certain embodiments are capable of providing an electronic device in which it is easy to install an electric wire or contact structure such as a contact terminal.

Certain embodiments are capable of providing an electronic device capable of reducing manufacturing costs and reducing the defective ratio due to assembly omission by simplifying the assembly steps of a contact terminal and the like.

According to certain embodiments disclosed herein, an electronic device may include: a housing including a first face oriented in a first direction, a second face oriented in a second direction opposite the first direction, and a side member at least partially surrounding a space defined between the first face and the second face, a support member disposed within the housing such that at least a portion of a side face of the support member is oriented towards an inner wall of the side member, a circuit board mounted on one face of the support member, an electrically conductive plate mounted on a second face of the support member, a contact member mounted on the support member so as to electrically couple at least a portion of the side member to the circuit board, wherein the contact member includes an end portion disposed adjacent to the plate, and an end face of the end portion includes a width smaller than a width of another portion of the contact member different than the end portion.

According to certain embodiments disclosed herein, an electronic device may include: a housing including a first face oriented in a first direction, a second face oriented in a second direction opposite the first direction, and a side member at least partially surrounding a space defined between the first face and the second face, a support member disposed within the housing such that at least a portion of a side face of the support member is oriented towards an inner wall of the side member, a circuit board mounted on one face of the support member, an electrically conductive plate mounted on a second face of the support member, and a contact member including a first portion protruding towards the side face of the support member and contacting the inner wall of the side member, and a second portion exposed to one face of the support member and electrically contacting the circuit board, wherein the contact member further includes a third portion electrically connecting the first portion to the second portion, and disposed within the support member.

According to certain embodiments disclosed herein, an electronic device manufacturing method may include: manufacturing an electrically conductive member including a plate and a contact member extending from the plate, disposing the electrically conductive member in a lower portion of a mold, the mold formed by a combination of the lower portion and an upper portion, after disposing the electrically conductive member in the lower mode, coupling the upper portion to the lower portion, injecting a molten resin into the mold and curing the molten resin to mold a support member, wherein at least a portion of the contact member is disposed within the molded support member.

According to certain embodiments, the contact member is disposed within the support member, which is built in the housing. Thus, it is possible to simplify an assembly step or the quality inspection of an assembly. For example, an insert injection molding step can be utilized to bury and place the contact member in the support member, the contact member can be disposed in the upper or lower mold in the state of being integrally formed with an electrically conductive plate provided on the support member (e.g., a ground conductor), and the contact member can be cut and separated from the electrically conductive plate in the process of coupling the upper mold and the lower mold. As a result, even if the contact member is considerably miniaturized, the contact member is handled as a member integrated with the electrically conductive plate until the contact member is disposed inside the mold in the insert injection step. Thus, it is possible to facilitate the handling of the contact member, and to suppress a defect resulting from, for example, the contact member escaping.

BRIEF DESCRIPTION OF THE DRAWINGS

The above and other aspects, features, and advantages of the present disclosure will be more apparent from the following detailed description taken in conjunction with the accompanying drawings, in which.

DETAILED DESCRIPTION

Figure 1A:
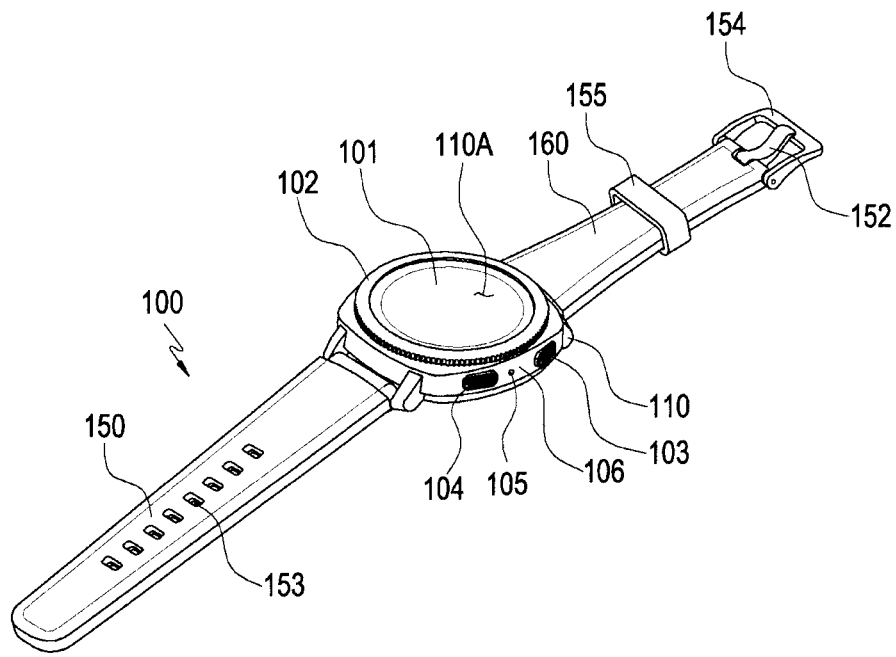
FIG. 1A and FIG. 1B are perspective views each illustrating an electronic device according to certain embodiments.

As the present disclosure allows for various changes and numerous embodiments, some example embodiments will be described in detail with reference to the accompanying drawings. However, the embodiments do not limit the present disclosure to a specific implementation, but should be construed as including all modifications, equivalents, and replacements included in the present disclosure.

Although ordinal terms such as "first" and "second" may be used to describe various elements, these elements are not limited by the terms. The terms are used merely for the purpose to distinguish an element from the other elements. For example, a first element could be termed a second element, and similarly, a second element could be also termed a first element without departing from the scope of the present disclosure. As used herein, the term "and/or" includes any and all combinations of one or more associated items.

Further, the relative terms "a front surface", "a rear surface", "a top surface", "a bottom surface", and the like which are described with respect to the orientation in the drawings may be replaced by ordinal numbers such as first and second. In the ordinal numbers such as first and second, their order are determined in the mentioned order or arbitrarily and may not be arbitrarily changed if necessary.

In the present disclosure, the terms are used to describe specific embodiments, and are not intended to limit the present disclosure. As used herein, the singular forms are intended to include the plural forms as well, unless the context clearly indicates otherwise. In the description, it should be understood that the terms "include" or "have" indicate existence of a feature, a number, a step, an operation, a structural element, parts, or a combination thereof, and do not previously exclude the existences or probability of addition of one or more another features, numeral, steps, operations, structural elements, parts, or combinations thereof.

Unless defined differently, all terms used herein, which include technical terminologies or scientific terminologies, have the same meaning as that understood by a person skilled in the art to which the present disclosure belongs. Such terms as those defined in a generally used dictionary are to be interpreted to have the meanings equal to the contextual meanings in the relevant field of art, and are not to be interpreted to have ideal or excessively formal meanings unless clearly defined in the present specification.

In the present disclosure, an electronic device may be a random device, and the electronic device may be called a terminal, a portable terminal, a mobile terminal, a communication terminal, a portable communication terminal, a portable mobile terminal, a touch screen or the like.

For example, the electronic device may be a smartphone, a portable phone, a game player, a TV, a display unit, a heads-up display unit for a vehicle, a notebook computer, a laptop computer, a tablet Personal Computer (PC), a Personal Media Player (PMP), a Personal Digital Assistants (PDA), and the like. The electronic device may be implemented as a portable communication terminal which has a wireless communication function and a pocket size. Further, the electronic device may be a flexible device or a flexible display device.

The electronic device may communicate with an external electronic device, such as a server or the like, or perform an operation through an interworking with the external electronic device. For example, the electronic device may transmit an image photographed by a camera and/or position information detected by a sensor unit to the server through a network. The network may be a mobile or cellular communication network, a Local Area Network (LAN), a Wireless Local Area Network (WLAN), a Wide Area Network (WAN), an Internet, a Small Area Network (SAN) or the like, but is not limited thereto.

Figure 1B:
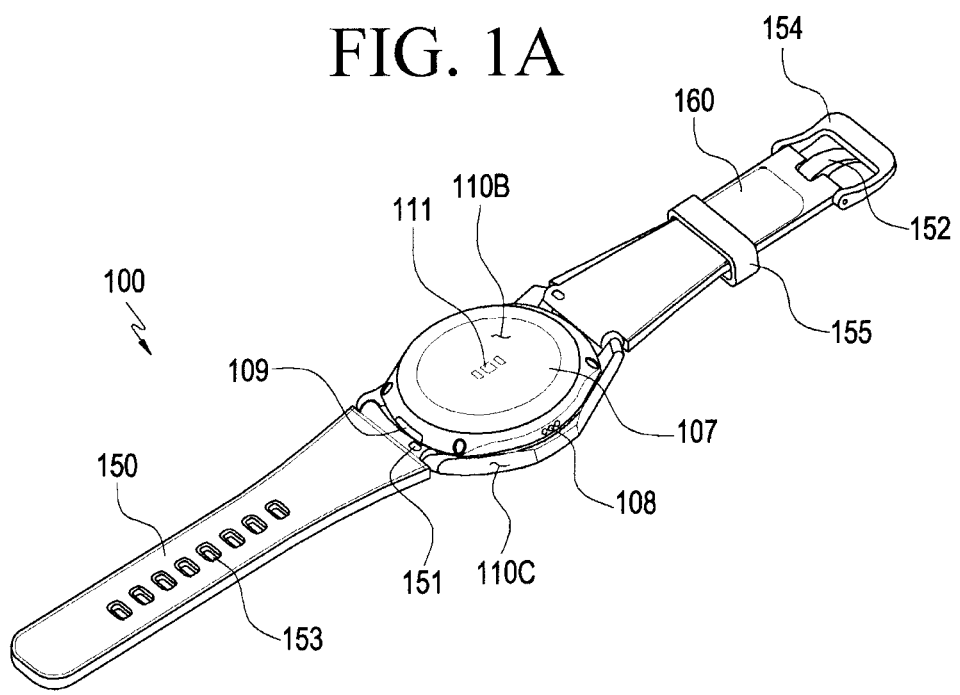

FIGS. 1A and 1B are perspective views each illustrating an electronic device 100 according to certain embodiments.

Referring to FIGS. 1A and 1B, an electronic device 100 according to an embodiment may include: a housing 110 including a first face (or a front face) 110A, a second face (or a rear face) 110B, and a side face 110C surrounding a space between the first face 110A and the second face 110B; and binding members 150 and 160 connected to at least a portion of the housing 110 and configured to bind the electronic device 100 on a portion of a user's body (e.g., a wrist or an ankle). In another embodiment (not illustrated), the housing may refer to a structure forming a portion of the first face 110A, the second face 110B, and the side face 110C.

According to certain embodiments, at least a portion of the first face 110A may be formed by a substantially transparent front plate 101 (e.g., a glass plate or a polymer plate including various coating layers). The second face 110B may be formed by a substantially opaque rear plate 107. The rear plate 107 may be formed of, for example, coated or colored glass, ceramic, polymer, metal (e.g., aluminum, stainless steel (STS), or magnesium), or a combination thereof. The side face 110C may be formed by a side bezel structure (or a "side member") 106 coupled to the front plate 101 and the rear plate 107 and including a metal and/or a polymer. In some embodiments, the rear plate 107 and the side bezel structure 106 are integrally formed, and may include the same material (e.g., a metal material such as aluminum). The binding members 150 and 160 may be formed of various materials and in various shapes. An integrated unit link and a plurality of unit links may be formed to be movable with respect to each other by a woven material, leather, rubber, urethane, metal, ceramics, or a combination thereof.

According to an embodiment, the electronic device 100 may include at least one of a display (e.g., display device 202 of FIG. 2), an audio module 105 and 108, a sensor module 111, key input devices 102, 103, and 104, and a connector hole 109. In some embodiments, in the electronic device 100, at least one component ((e.g., the key input devices 102, 103, and 104, the connector hole 109, or the sensor module 111) may be omitted, or other components may be added.

For example, the display may be exposed through a substantial portion of the front plate 101. The shape of the display may have a shape corresponding to the shape of the front plate 101, and may be various shapes such as a circle, an ellipse, and a polygon. The display may be coupled to or disposed adjacent to a touch sensing circuit, a pressure sensor capable of measuring the intensity of a touch (pressure), and/or a fingerprint sensor.

According to certain embodiments, the audio module 105 and 108 may include a microphone hole 105 and a speaker hole 108. The microphone hole 105 may include a microphone disposed therein so as to acquire external sound, and in some embodiments, a plurality of microphones disposed therein so as to sense the direction of a sound. The speaker hole 108 may be used as an external speaker and a call receiver. In some embodiments, the speaker hole 108 and the microphone hole 105 may be implemented as a single hole, or a speaker may be included without a speaker hole 108 (e.g., a piezo speaker).

According to certain embodiments, the sensor module 111 may generate an electrical signal or a data value corresponding to an internal operating state of the electronic device 100 or an external environmental condition. For example, The sensor module 111 may include a biological sensor module 111 (e.g., an HRM sensor) disposed on the second face 110B of the housing 110. The electronic device 100 may further include at least one of sensors not illustrated in the drawings, for example, a gesture sensor, a gyro sensor, an air pressure sensor, a magnetic sensor, an acceleration sensor, a grip sensor, a color sensor, an infrared (IR) sensor, a biometric sensor, a temperature sensor, a humidity sensor, and an illuminance sensor.

According to certain embodiments, the key input devices 102, 103, and 104 may include a wheel key 102 disposed on the first face 110A of the housing 110 and configured to be rotatable in at least one direction, and/or side key buttons 102 and 103 disposed on the side face 110C of the housing 110. The wheel key may have a shape corresponding to the shape of the front plate 101. In another embodiment, the electronic device 100 may not include some or all of the above-mentioned key input devices 102, 103, and 104, and a non-included key input device 102, 103, or 104 may be implemented in another form such as a soft key on the display. The connector hole 109 may accommodate a connector (e.g., a USB connector) configured to transmit and receive power and/or data to and from an external electronic device, and may include another connector hole (not illustrated) capable of accommodating a connector configured to transmit and receive an audio signal to and from an external electronic device. The electronic device 100 may further include, for example, a connector cover (not illustrated) that covers at least a portion of the connector hole 109 and blocks the entry of external foreign matter into the connector hole.

According to certain embodiments, each of the binding members 150 and 160 may be detachably fastened to at least a portion of the housing 110 using a locking member 151. In an embodiment, each of the binding members 150 and 160 may include at least one of a fixing member 152, fixing member fastening holes 153, a band guide member 154, and a band fixing ring 155.

According to certain embodiments, the fixing member 152 (e.g., a fastener) may be configured to fix the housing 110 and the binding members 150 and 160 to the user's body part (e.g., a wrist or an ankle). The fixing member fastening holes 153 is capable of fixing the housing 110 and the binding members 150 and 160 (e.g., fasteners) to the user's body part in correspondence with the fixing member 152. The band guide member 154 is configured to limit the movement range of the fixing member 152 when the fixing member 152 is fastened to any of the fixing member fastening holes 153 so as to ensure that the binding members 150 and 160 are brought into close contact with and are bound on the user's body part. The band fixing ring 155 is capable of limiting the movement range the binding members 150 and 160 in the state in which the fixing member 152 and the fixing member fastening hole 153 are fastened to each other.

Figure 2:
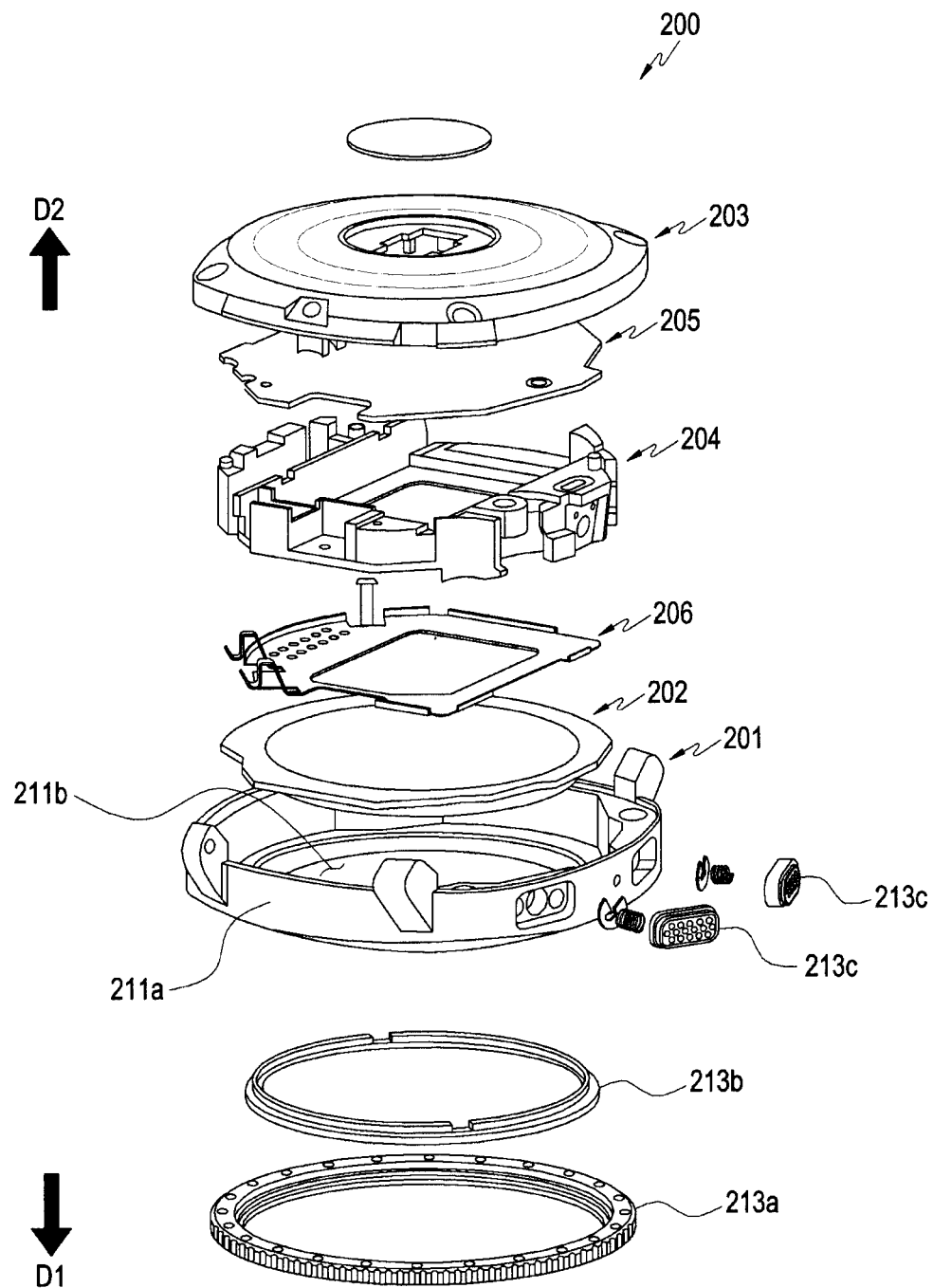
FIG. 2 is an exploded perspective view illustrating the electronic device according to certain embodiments.
Figure 3:
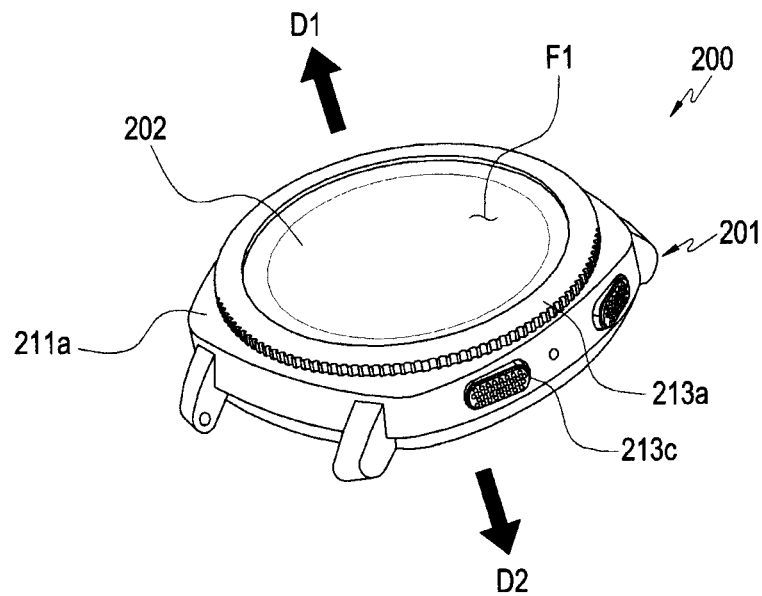
FIG. 3 is a perspective view illustrating an electronic device according to certain embodiments in an assembled state.
Figure 4:
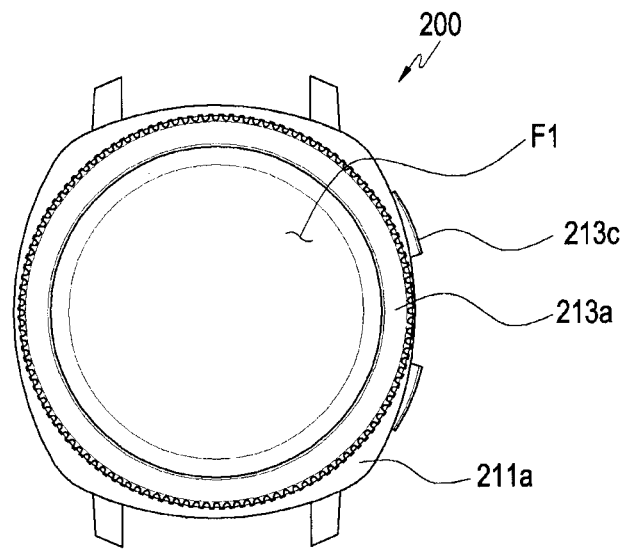
FIG. 4 is a plan view illustrating an electronic device according to certain embodiments.
Figure 5:
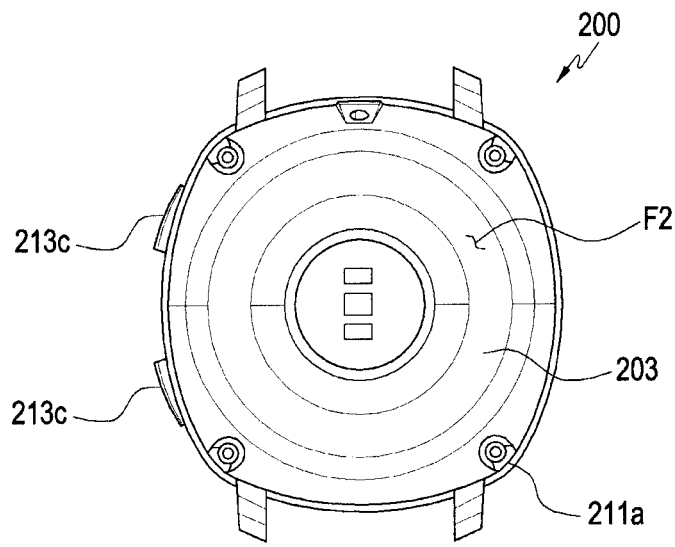
FIG. 5 is a bottom view illustrating the electronic device according to certain embodiments.
Figure 6:
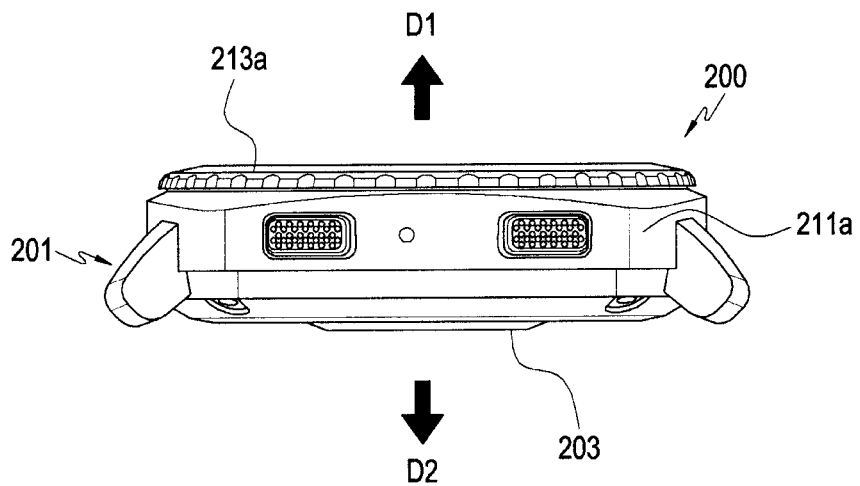
FIG. 6 is a side view illustrating the electronic device according to certain embodiments.

FIG. 2 is an exploded perspective illustrating the electronic device 200, according to certain embodiments, in a disassembled state. FIG. 3 is a perspective view illustrating the assembly of the electronic device 200 (e.g., the electronic device 100 in FIG. 1A or 1B) according to certain embodiments. FIG. 4 is a plan view illustrating the electronic device 200 according to certain embodiments. FIG. 5 is a bottom view illustrating the electronic device 200 according to certain embodiments. FIG. 6 is a side view illustrating the electronic device 200 according to certain embodiments.

Referring to FIGS. 2 to 6, the electronic device 200 (e.g., the electronic device 100 of FIG. 1A or 1B) according to an embodiment of the present disclosure may include a housing 201 (e.g., the housing 101 in FIG. 1A or 1B), a support member 204, a circuit board (205), and a contact member 206a (illustrated in FIG. 18), and the contact member 206a may come into contact with the side member 211a (the side bezel structure 106 of FIG. 1A or 1B) of the housing 201 while mounted on the support member 204. According to an embodiment, the contact member 206a may electrically couple and/or connect a portion of the housing 201 (e.g., a portion of the side member 211a) to the circuit board 205. At least a portion of the housing 201 that is electrically connected to the circuit board 205 may include an electrically conductive material, and the electronic device 200 may transmit and receive a wireless signal using the portion of the housing 201 which is formed of the electrically conductive material.

According to an embodiment, at least one of the components of the electronic device 200 may be the same or similar to at least one of the components of the electronic device 100 of FIG. 1A or 1B, and a redundant description may be omitted in the following description. According to another embodiment, the electronic device 200 may include the binding members 150 and 160 of FIG. 1A or 1B, so that the user can carry or use the electronic device 200 in the state in which the electronic device 200 is worn on the user's body.

According to certain embodiments, the housing 201 may include a first face F1 oriented in a first direction D1 (e.g., the front face or top face), a second face F2 oriented in a second direction D2 opposite the first direction (e.g., the rear face or bottom face), and a side member 211a at least partially surrounding a space (e.g., the space denoted by reference numeral "211b") between the first face F1 and the second face F2. According to an embodiment, the electronic device 200 may include a display device 202 disposed on the front or top face, in which the first face F1 of the housing 201 is substantially defined by the display device 202. In another embodiment, the electronic device 200 may include a cover member 203 disposed on the rear face or bottom face, and the second face F2 of the housing 201 may be substantially defined by the cover member 203.

According to certain embodiments, the display device 202 or the cover member 203 may include a glass plate or a polymer plate including various coating layers. According to an embodiment, in the display device 202, at least a portion of the region made of a glass plate or a polymer plate may include a transparent region, through which a screen is visible from an exterior of the device. According to another embodiment, the cover member 203 may be formed of, for example, coated or colored glass, ceramic, polymer, metal (e.g., aluminum, stainless steel (STS), or magnesium), or a combination thereof.

According to certain embodiments, the display device 202 or the cover member 203 may be made of a glass or ceramic material, and a portion of the display device 202 may be disposed adjacent to the metal material portion of the side member 211a. In an embodiment, when a portion of the cover member 203, which is made of a glass or ceramic material, is disposed adjacent to the metal material portion of the side member 211a, a member or layer made of a synthetic resin may be interposed therebetween so as to prevent direct contact between the glass or ceramic material and the metal material portion. For example, it is possible to prevent the cover member 203 made of the glass or ceramic material from being damaged by an external impact.

Although the housing 201, the display device 202, and the cover member 203 are described as separate components, in certain embodiments of the present disclosure this is for brevity of description, and the appearance of the electronic device 200 may substantially be formed by coupling the display device 202 and the cover member 203 to the housing 201. For example, it is noted that the "housing" referred to in a specific embodiment of the present disclosure may be understood to include the display device 202 and the cover member 203.

According to certain embodiments, the side member 211a may substantially define the sidewall of the electronic device 200, e.g., the housing 201, and the support member 204, the circuit board 205, and the like are capable of being accommodated in an internal space 211b (e.g., the space between the first face F1 and the second face F2). Although not illustrated, wearing bands (e.g., the binding members 150 and 160 of FIGS. 1A and 1B) may be provided on the outer face of the side member 211a so as to allow the user to wear the electronic device 200 affixed to the user's body. In some embodiments, the housing 201 may include a plurality of keys 213c (e.g., side key buttons 102 and 103 of FIG. 1A) mounted on the side member 211a, and the keys 213c may be used as input devices for the electronic device 200. All or a part of the side member 211a may be made of, for example, an electrically conductive material. In an embodiment, a portion of the side member 211a may be electrically connected to the circuit board 205 via the contact member 206a, while electrically insulated from the other portion. A communication module may be mounted on the circuit board 205, and a portion of the side member 211a may be connected to the communication module of the circuit board 205 to be used as an antenna device (e.g., a radiating conductor).

According to certain embodiments, the housing 201 may include a wheel key 213a (e.g., the wheel key 102 in FIG. 1A) disposed on the front face (e.g., the first face F1). The wheel key 213a has a substantially circular frame shape and is rotatably coupled to the front face of the housing 201 through a lubrication member 213b so as to be rotatable in a circumferential direction on the front face of the housing 201. The electronic device 200 may detect the rotation of the wheel key 213a to change an operation mode, or to perform various functions according to the operation mode. For example, the wheel key 213a may be rotated to adjust the volume in a multimedia playback mode, or to perform a zoom function in a camera mode. In some embodiments, the wheel key 213a or the lubrication member 213b may be combined with a serrated structure that provides tactile feedback to operation of the wheel key, such as a click-style feeling, an optical or mechanical encoder that detects the amount of rotation, or the like.

According to certain embodiments, the display device 202 may be mounted on the housing 201 to form a front face of the electronic device 200, for example, the first surface F1 of the housing 201. The display device 202 may be an input device including, for example, a touch panel while also being a display device. For example, the display device 202 may output a screen within a region surrounded by the wheel key 213a, and may detect a user's touch, drag, hovering input, or the like in the screen output region.

According to certain embodiments, the cover member 203 may be coupled to the housing 201 to substantially define the rear face of the electronic device 200 (e.g., the second face F2 of the housing 201), and to enclose the inner space of the housing 201. When the user wears the electronic device 200, the cover member 203 may maintain direct contact with the user's body. In an embodiment, the cover member 203 may include a sensor (e.g., the sensor module(s) 111 in FIG. 1B), such as an electrode or an optical element, for detecting biometric information of the user, and whether the device is worn by the user, the electronic device 200 is capable of detecting information on the user's health state, such as their heartbeat, through a sensor provided on the cover member 203.

According to certain embodiments, the support member 204 is accommodated in the internal space 211b of the housing 201 and is used as a structure for mounting and fixing the display device 202, the circuit board 205, and the like, and in an embodiment, the support member 204 may be connected to the side member 211a or may be integrally formed with the side member 211a. In another embodiment, the support member 204 may be formed of a metallic material or a non-metallic material (e.g., polymer) so as to improve the stiffness and electrical stability of the electronic device 200. For example, the support member 204 may include an electrically conductive plate 206b (illustrated in FIG. 18) so as to provide electrical stability within the electronic device 200 while providing rigidity to the electronic device 200. For example, the conductive plate 206b may be utilized as a grounding conductor.

In FIG. 2, the above-described contact member 206a and the plate 206b are illustrated as an integrated member (e.g., the electrically conductive member 206) in which the contact member 206a and the plate 206b are interconnected with each other. However, it is noted that on the support member 204, the contact member 206a and the plate 206b may be mounted in an electrically separated state, and each of the contact member 206a and the plate 206b may be installed as to be at least partially disposed within the support member 204. As will be described later, according to an embodiment, the support member 204 is molded by performing insert injection molding in the state in which the electrically conductive member 206 is inserted into the mold. In the insert injection molding process, the electrically conductive member 206 may be cut and separated into the contact member 206a and the plate 206b. In an embodiment, upon completion of the molding of the support member 204, at least a portion of each of the contact member 206a and the plate 206b may be disposed within the support member 204.

The configurations of the electrically conductive member 206, the contact member 206a, the plate 206b, and the like will be described in more detail with reference to FIG. 8 and the like.

According to certain embodiments, when the support member 204 is installed in the housing 201, the plate 206b may be provided on one face of the support member 204 so as to face an inner face of the display device 202. The support member 204 (e.g., such as the plate 206b) may electromagnetically shield the display device 202 and may prevent interference with other structures. For example, the support member 204 may prevent an electrode layer, a light-emitting layer, a glass substrate, and the like of the display device 202 from interfering with other structures. In some embodiments, the support member 204 may include a space capable of accommodating a battery (not illustrated).

According to certain embodiments, the battery may supply power to at least one component of the electronic device 200 and may include, for example, a non-rechargeable primary battery, a rechargeable secondary battery, or a fuel cell. At least a portion of the battery may be disposed to be substantially flush with, for example, the circuit board 205. The battery may be provided as a built-in structure installed within the electronic device 200 (e.g., non-removable) in one embodiment, and may also be removably disposed in the electronic device 200 in another embodiment.

According to certain embodiments, on the circuit board 205, for example, a processor, a memory, a communication module, various sensor modules, an interface, a connection terminal, and the like may be mounted. The processor may include, for example, one or more of a central processing unit, an application processor, a Graphics Processing Unit (GPU), a sensor processor, and a communications processor. The memory may include, for example, a volatile memory or a non-volatile memory. The interface may include, for example, an HDMI, a USB interface, an SD card interface, or an audio interface. The interface may electrically or physically connect the electronic device 200 to an external electronic device, and may include a USB connector, an SD card, an MMC connector, an audio connector, or the like.

According to certain embodiments, the processor, the memory, the communication module, and the like may be mounted on each integrated circuit chip, or two or more selected components may be integrated into one integrated circuit chip and mounted on the circuit board 205. According to an embodiment, the circuit board 205 may be disposed to face the cover member 203 and may be disposed to face the display device 202 across the support member 204. For example, the circuit board 205 may be mounted and supported on the other face of the support member 204, and may be installed in the housing 201 while being spaced apart from the display device 202.

According to certain embodiments, the circuit board 205 may be in electrical contact with any one portion of the contact member 206a which is exposed on the support member 204. For example, the circuit board 205 may include a contact terminal mounted on one face of the circuit board 205, and the contact terminal may be in electrical contact with the contact member 206a in the housing 201. In some embodiments, a contact terminal, such as a C-clip (e.g., a C-clip 251, a pogo pin, or the like in FIG. 18) may be utilized. A connection structure between the contact terminal and the contact member 206a will be described in more detail with reference to FIG. 18. In an embodiment, a portion of the contact member 206a (e.g., a portion exposed to the outside of the support member 204) comes into contact with the side member 211a (e.g., a portion made of an electrically conductive material), and the C-clip 251 may be electrically connected to the communication module on the circuit board 205. For example, a portion of the side member 211*a* including an electrically conductive material may be connected to the communication module via the contact member 206*a* and the C-clip 251, and the communication module may use a portion of the side member 211*a* as a radiating conductor.

Although not illustrated, the electronic device 200 may further include an antenna provided in the form of a flat plate or a film. For example, at least one of a Near Field Communication (NFC) antenna, a wireless charging antenna, or a Magnetic Secure Transmission (MST) antenna may be fabricated in a thin film form (e.g., a flat coil). Such an antenna device may be easily interposed, for example, between the display device 202 and the support member 204 (e.g., the electrically conductive plate 206*b*) or between the circuit board 205 and the cover member 203. The above-described antenna may perform short-range communication with an external device, may wirelessly transmit and receive power utilized for charging, and may transmit a magnetic-based signal including a short distance communication signal or payment data.

Figure 7:
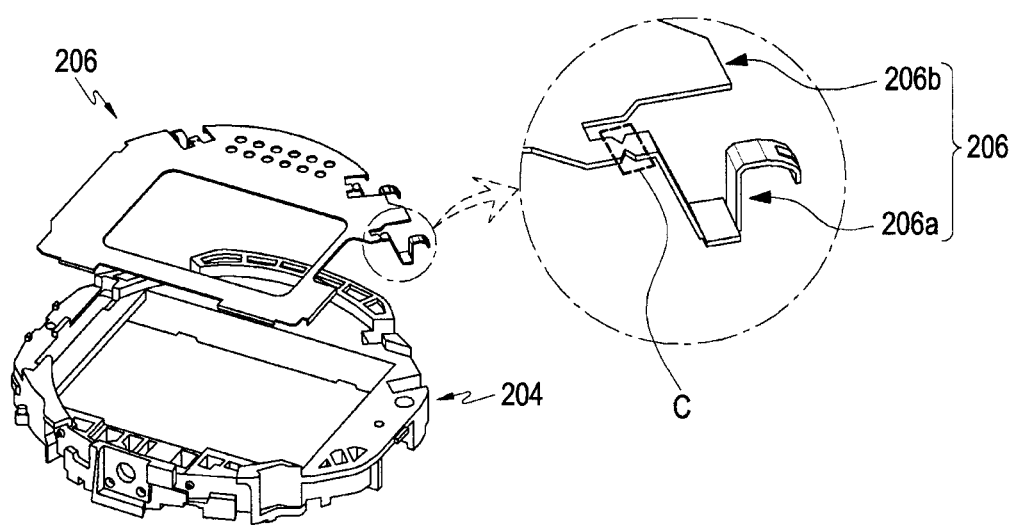
FIG. 7 is a view for describing a structure of an electrically conductive member in the electronic device according to certain embodiments.
Figure 8:
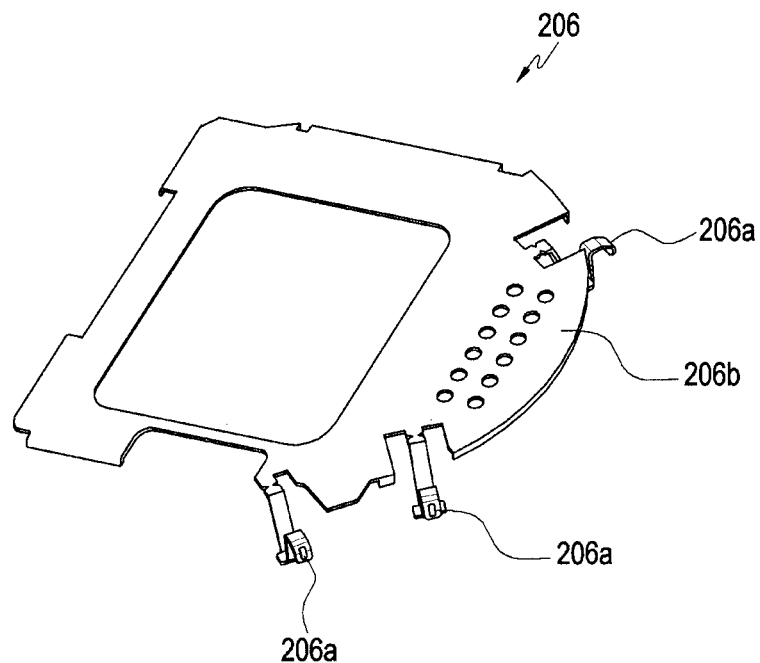
FIG. 8 is a perspective view illustrating the electrically conductive member of the electronic device according to certain embodiments.
Figure 9:
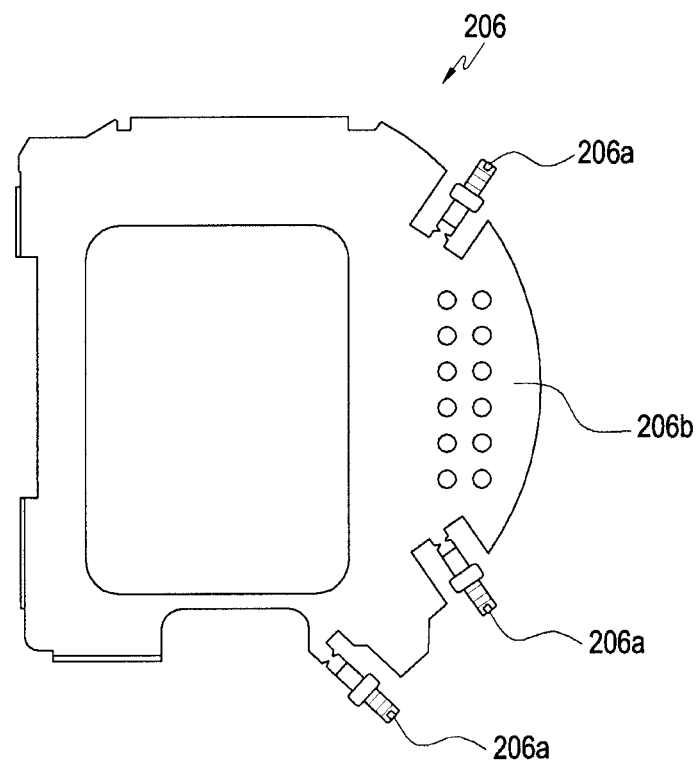
FIG. 9 is a plan view illustrating the electrically conductive member of the electronic device according to certain embodiments.
Figure 10:
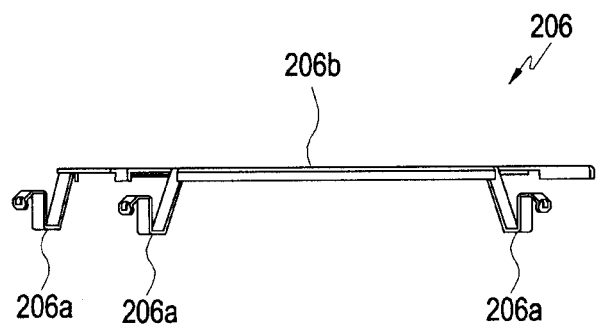
FIG. 10 is a side view illustrating the electrically conductive member of the electronic device according to certain embodiments.

FIG. 7 is a view for describing a structure of an electrically conductive member 206 in the electronic device according to certain embodiments; and FIG. 8 is a perspective view illustrating the electrically conductive member 206 of the electronic device according to certain embodiments of the present disclosure. FIG. 9 is a plan view illustrating the electrically conductive member 206 of the electronic device according to certain embodiments of the present disclosure. FIG. 10 is a side view illustrating the electrically conductive member 206 of the electronic device according to certain embodiments of the present disclosure.

Referring to FIGS. 7 to 10, the electrically conductive member 206 may include a flat plate shape formed by processing a metal plate, and may include a portion formed by bending a portion of the metal plate at an edge of the metal plate. According to an embodiment, the above-described contact member (e.g., the contact member 206*a*) is formed using the bent portion at the edge of the electrically conductive member 206, and the electrically conductive plate (e.g., the plate 206*b*) may be formed using a portion including a generally flat shape in the electrically conductive member 206. The electrically conductive member 206 may be cut and separated into the contact member 206*a* and the plate 206*b* during a process for molding the support member (e.g., insert injection molding step), and when the electrically conductive member 206 is installed (mounted) on the molded support member 204, the contact member 206*a* and the plate 206*b* may then be electrically separated from each other.

According to certain embodiments, the electrically conductive member 206 may include a connection portion C in which a notch is formed, so that the electrically conductive member 206 can be easily cut and separated into the contact member 206*a* and the plate 206*b*. For example, the connection portion C may be formed adjacent to an edge of the electrically conductive member 206 and may include a notch so as to have a width or thickness smaller than that of the other portion of the contact member 206*a* and/or that of the other portion of the plate 206*b*. The configuration of the contact member 206*a* and the connection portion C will be described with reference to FIGS. 11 to 14.

FIGS. 11 to 14 are views, each provided for describing the connection portion C of an electrically conductive member in the electronic device according to certain embodiments.

Figure 11:
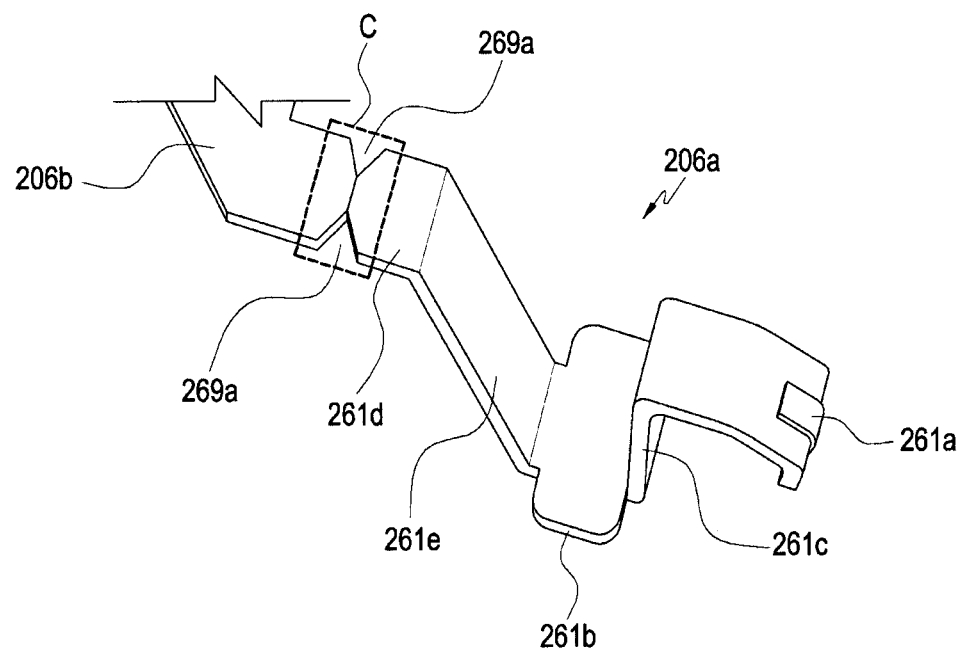
FIG. 11, FIG. 12, FIG. 13 and FIG. 14 are views for describing a connection portion of an electrically conductive member in the electronic device according to certain embodiments.
Figure 12:
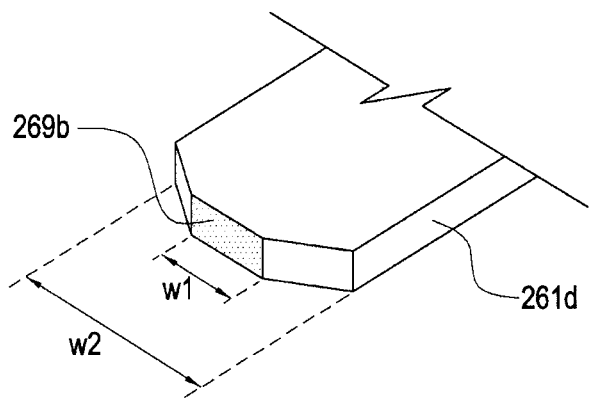

Referring to FIGS. 11 and 12, the contact member 206*a* may be connected to the plate 206*b* via the connection portion C, and may be bent into a predetermined shape before being cut and separated. The end portion of the first portion 261*a* of the contact member 206*a*, which is located far from the plate 206*b* (which hereinafter is referred to as a "first portion 216*a*"), may form a bent portion exposed to the side face of the support member 204. The bent portion, such as the first portion 261*a*, may be bent into a predetermined shape and be disposed as to be in stable contact with the inner wall of the side member 211*a*. A portion of the contact member 206*a* which is located between the opposite ends of the contact member 206*a* (hereinafter, referred to as a "second portion 261*b*") may be exposed to the other face of the support member 204 (e.g., the face facing the circuit board 205) so as to form a contact portion. For example, the second portion 261*b* may be in contact with a contact terminal (e.g., the C-clip 251 in FIG. 18) of the circuit board 205. The first portion 261*a* and the second portion 261*b* may be electrically connected through a first connection portion. For example, a third portion 261*c* of the contact member 206*a* disposed within the support member 204 may electrically connect the first portion 261*a* and the second portion 261*b*.

According to an embodiment, an end portion of the contact member 206*a*, which is adjacent to the plate 206*b* (e.g., hereinafter, referred to as a "fourth portion 261*d*"), may be exposed to one face of the support member 204, and may be connected to the second portion 261*b* via a fifth portion 261*e* of the contact member 206*a* disposed within the support member 204. The fourth portion 261*d* substantially forms the contact member 206*a* and the plate 260*b* as a single body (e.g., the electrically conductive member 206) so as to facilitate insert injection molding, and after the support member 204 is molded, the fourth portion 261*d* may be utilized as a dummy portion or a fixing portion that more firmly fixes the contact member 206*a*. The fifth portion 261*e* may in some examples be made of a non-electrically conductive material, but may also include electrical conductivity as a portion of the contact member 206*a*, as formed during the process of processing the electrically conductive member 206.

According to certain embodiments, the connection portion C may be formed on a portion extending to form the contact member 206*a* on the electrically conductive member 206 and may include at least one notch 269*a*. According to an embodiment, the notch(es) 269*a* may have a V-groove shape formed at one side edge or at opposite side edges of the extension of the electrically conductive member 206 so as to be symmetrical to each other. In some embodiments, the shape of the notch(es) 269*a* may have various shapes, such as a semicircular groove shape and a polygonal shape. The contact member 206*a* may be cut and separated from the plate 206*b* in the region where the notch(es) 269*a* is formed. When the electrically conductive member 206 is separated into the contact member 206*a* and the plate 206*b*, a cut face 269*b* is formed on an end face of an end portion of the contact member 206*a*, and another cut face corresponding to the cut face 269*b* may also be formed at the edge of the plate 206*b*.

According to certain embodiments, one end face of the contact member 206*a*, for example, the cut face 269*b* may have a width w1 less than the width w2 of the other portion of the contact member 206*a*. For example, the connection portion C may include the notch(es) 269*a*, and the width of the cut face 269b may be smaller than the width of the other portion of the contact member 206a due to the formation of the notch(es) 269a.

Figure 13:
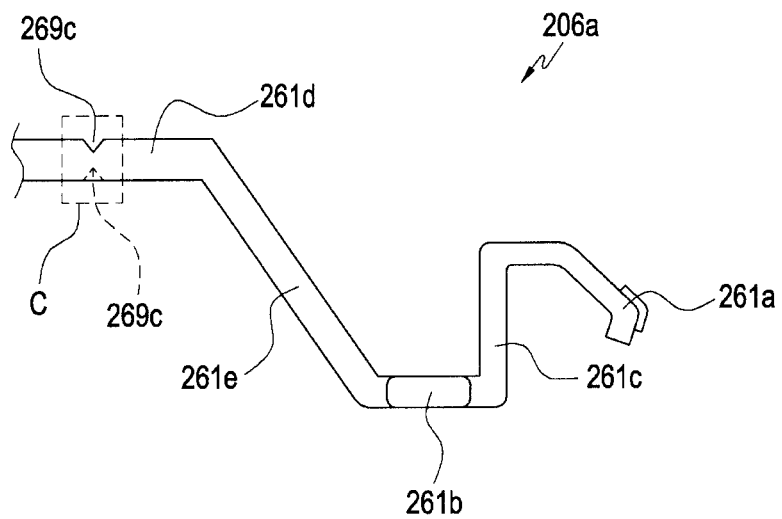
Figure 14:
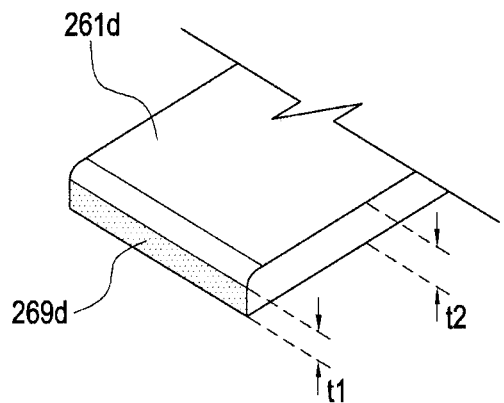

Referring to FIGS. 13 and 14, the connection portion C may include a notch 269c formed on the top face or the bottom face of the electrically conductive member 206. The contact member 206a may be cut and separated from the electrically conductive member 206 in the region where the notch(es) 269c is formed. When the contact member 206a is separated from the electrically conductive member 206, a cut face 269d may be formed on an end face of an end portion of the contact member 206a, and another cut face corresponding to the cut face 269d may also be formed on the edge of the plate 206b.

According to certain embodiments, an end face of an end portion of the contact member 206a, for example, the cut face 269d, may have a thickness t1 less than the thickness t2 of the other portion of the contact member 206a. For example, the connection portion C may include the notch(es) 269c, and the thickness of the cut face 269d may be smaller than the thickness of the other portion of the contact member 206a due to the formation of the notch(es) 269c.

According to certain embodiments, when an external force (e.g., a shearing force) is applied to the electrically conductive member 206 on the opposite faces of the connection portion C (e.g., the region where the cut face 269a and 269b are formed, which may take the form of notches), the contact member 206a can be cut and separated from the electrically conductive member 206 at a position where the width or thickness is the smallest. For example, when a shearing force is applied to one member, the greatest stress is generated in the cross section of the smallest width or thickness (e.g., the cross section having the smallest cross-sectional area) between two points where the force is applied, and the member subjected to the shearing force can be cut and separated into two portions along the position where the greatest stress is generated. According to certain embodiments of the present disclosure, by applying a shearing force to the electrically conductive member 206 using the upper mold and the lower mold coupled during the insert injection molding process, the contact member 206a can be cut and separated from the electrically conductive member 206. This will be described in more detail with reference to FIG. 20 and the like.

According to certain embodiments, the connection portion C may include at least one of the notch 269a illustrated in FIG. 11 and the notch 269c illustrated in FIG. 13. For example, in the one electrically conductive member 206, the connection portion C may include a first notch (e.g., the notch 269a in FIG. 11) formed at least at one side edge thereof, and a second notch (e.g., notch 269c in FIG. 13) formed on at least one of the top and bottom faces thereof. The positions, shapes, and number of the notches 269a and 269c in the connection portion C are suitably designed in consideration of how easy it is to handle or how easy it is to cut and separating by a shearing force during the insert injection molding process.

Figure 15:
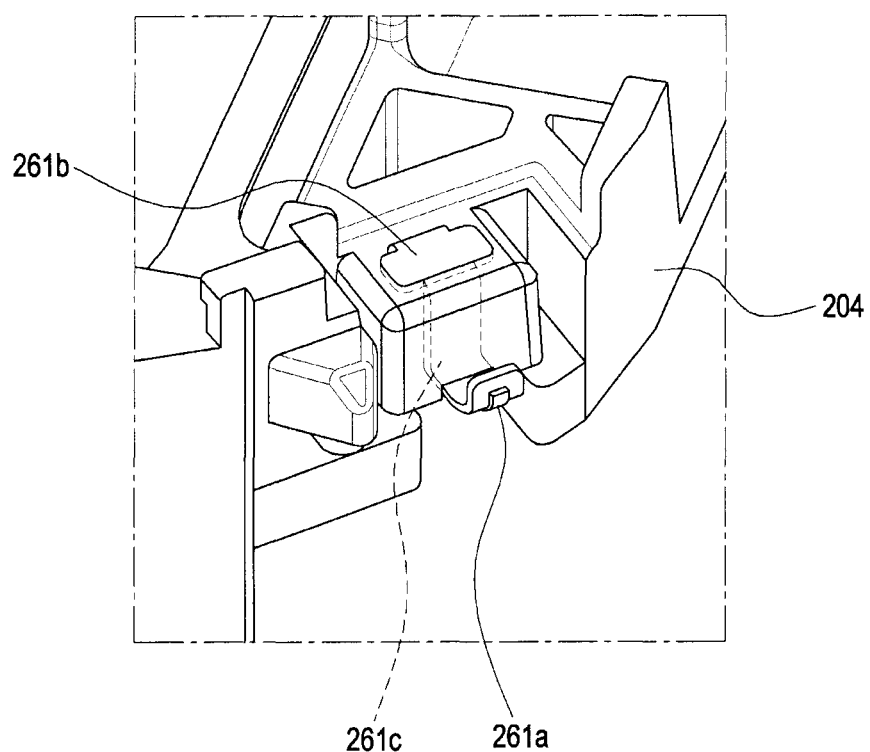
FIG. 15 is a view for describing the state in which a portion of a contact member is disposed within a support member in the electronic device according to certain embodiments.
Figure 16:
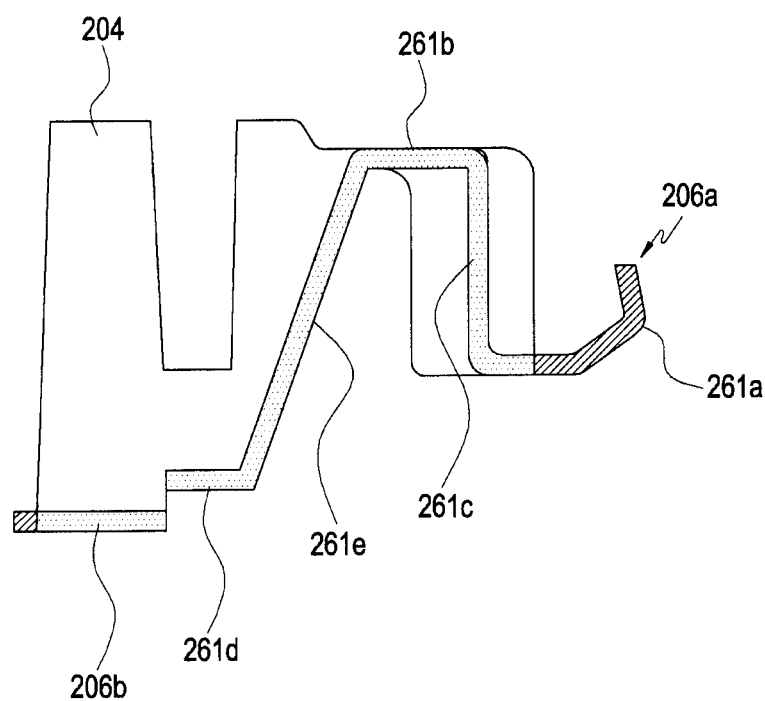
FIG. 16 is a cross-sectional view for describing the state in which a portion of the contact member is disposed within the support member in the electronic device according to certain embodiments.

FIG. 15 is a view illustrating a state in which a portion of the contact member 206a is disposed within the support member 204 in the electronic device according to certain embodiments. FIG. 16 is a cross-sectional view illustrating a state in which a portion of the contact member 206a is disposed within the support member 204 in the electronic device according to certain embodiments.

Referring to FIGS. 15 and 16, the electrically conductive member 206, such as the contact member 206a and the plate 206b, may be at least partially disposed within or attached the support member 204. According to an embodiment, the first portion 261a of the contact member 206a may protrude from the side face of the support member 204 and may extend at least partially obliquely with respect to the side face of the support member 204. The second portion 261b may be exposed on the other face of the support member 204, for example, the face facing the circuit board 205, and may be electrically connected to the first portion 261a via the third portion 261c (e.g., the first connection portion disposed within the support member 204).

According to certain embodiments, the fourth portion 261d may be disposed in a position "stepped" (e.g., on a different plane) relative to the plate 206b while being disposed adjacent the plate 206b to be exposed to one face of the support member 204. For example, while the fourth portion 261d is coupled to the plate 206b via the support member 204, the fourth portion 261d may be electrically isolated. In some embodiments, the contact member 206a is cut and separated by a shearing force applied to the electrically conductive member 206 in the mold for molding the support member 204, and the plate 206b may be moved by a certain amount in the mold. Through this movement, the fourth portion 261d and the plate 206b can be respectively fixed on the support member 204 at positions stepped with respect to each other. The fourth portion 261d may be connected to the second portion 261b via the fifth portion 261e. According to an embodiment, the fifth portion 261d may be disposed within the support member 204, and may be partially exposed to the outside of the support member 204.

According to certain embodiments, the plate 206b is positioned on one face of the support member 204, and may be utilized as a ground conductor of the electronic device 200. According to an embodiment, the plate 206b may be disposed within the support member 204, or may be partially exposed to the outside of the support member 204. In another embodiment, the support member 204 may be molded to enclose a portion of the edge of the plate 206b, and the plate 206b may be disposed to be exposed on one face of the support member 204 to face of the display device (e.g., the display device 202 in FIG. 2).

Figure 17:
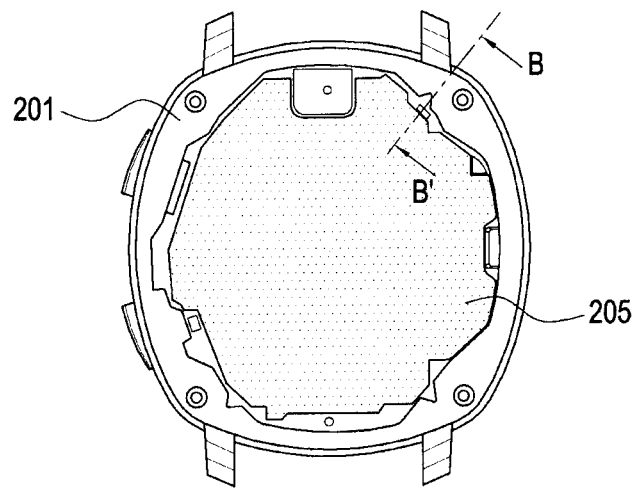
FIG. 17 is a bottom view illustrating a state in which a circuit board is assembled to a housing in an electronic device according to certain embodiments.
Figure 18:
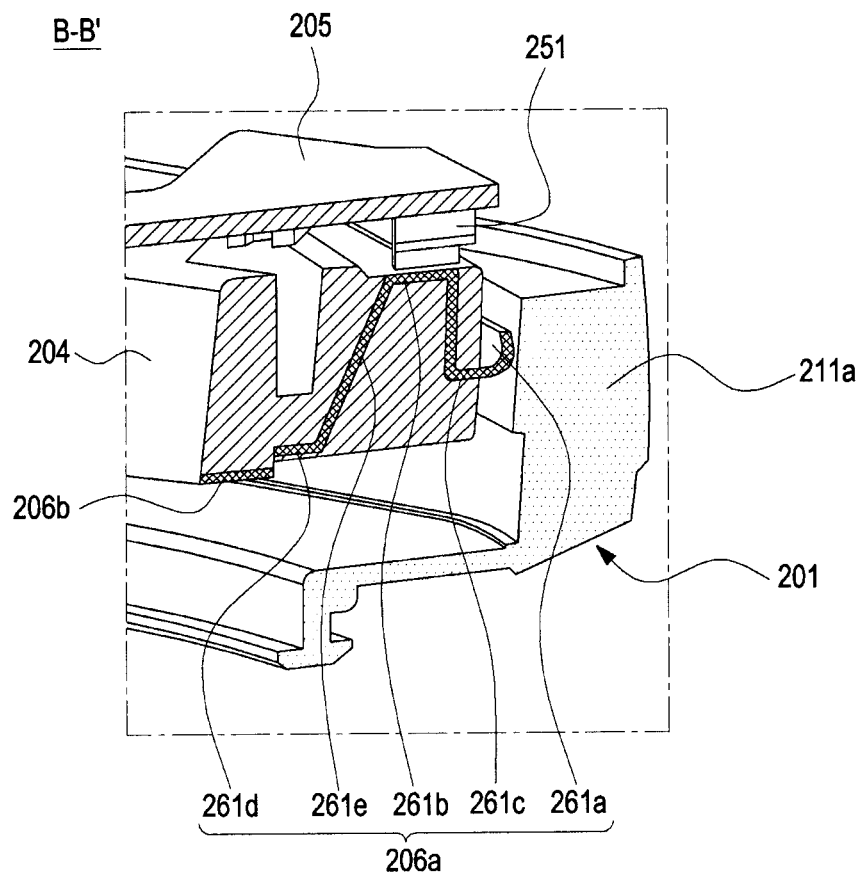
FIG. 18 is a perspective view in which a portion of the electronic device is cut along line B-B' in FIG. 17.
Figure 19:
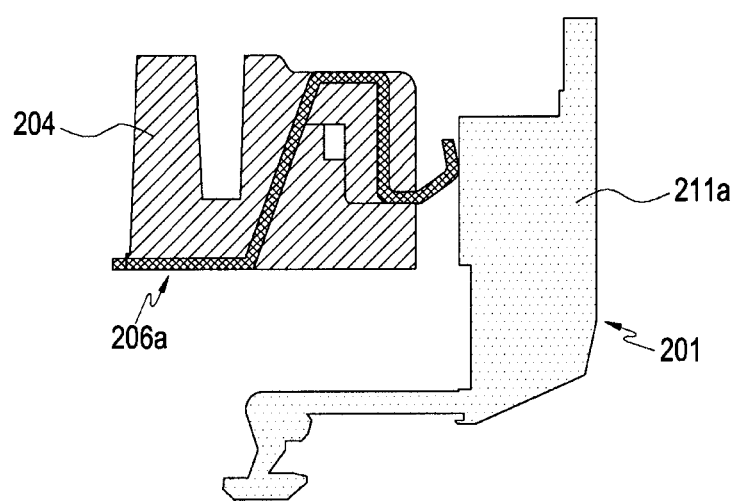
FIG. 19 is a cross-sectional view illustrating the state in which a contact member is in contact with a housing in an electronic device according to certain embodiments of the present disclosure.

FIG. 17 is a bottom view illustrating a state in which a circuit board 205 is assembled to a housing 201 in an electronic device according to certain embodiments. FIG. 18 is a perspective view in which a portion of the electronic device is cut along line B-B' in FIG. 17. FIG. 19 is a cross-sectional view illustrating the state in which the contact member 206a is in contact with the housing 201 in an electronic device according to certain embodiments.

Referring to FIGS. 17 to 19, when the support member 204 and the circuit board 205 are mounted in the housing 201, the first portion 261a of the contact member 206a may contact the inner wall of the side member 211a. According to an embodiment, the first portion 261a may extend obliquely to the side face of the support member 204 or the inner wall of the side member 211a while being exposed to the side face of the support member 204, and the portion in contact with the side member 211a may be a surface curved convexly toward the inner wall of the side member 211a. For example, while the support member 204 enters the inner space (e.g., the inner space 211b in FIG. 2) of the housing 201, the first portion 261a may rub against the inner wall of the side member 211a, and is capable of maintaining contact with the inner wall of the side member 211a by application of an amount of elastic force.

According to certain embodiments, the circuit board 205 may be disposed opposite the other face of the support member 204, and a contact terminal, e.g., a C-clip 251 connected to the communication module contacts with the second portion 261b. The C-clip 251 is able to maintain the state of being in contact with the second portion 261b by application of a certain amount of elastic force. In an embodiment, when at least a portion the side member 211a is made of an electrically conductive material, the first portion 261a may come into contact with the electrically conductive material portion of the side member 211a. For example, a portion of the side member 211a made of an electrically conductive material may be connected to a communication module of the electronic device 200, and the electronic device 200 may include at least a portion of the side member 211a as a radiating conductor. Thus, even if the electronic device 200 is significantly miniaturized, it is easy to secure the antenna structure.

Hereinafter, a method of manufacturing an electronic device as described above, for example, a manufacturing method of partially embedding a contact member (e.g., the conductive member 206 illustrated in FIG. 15 or 16) in a support member (e.g., the support member 204 in FIG. 15 or 16) through insert injection molding, will be described with reference to FIG. 20 and the like.

Figure 20:
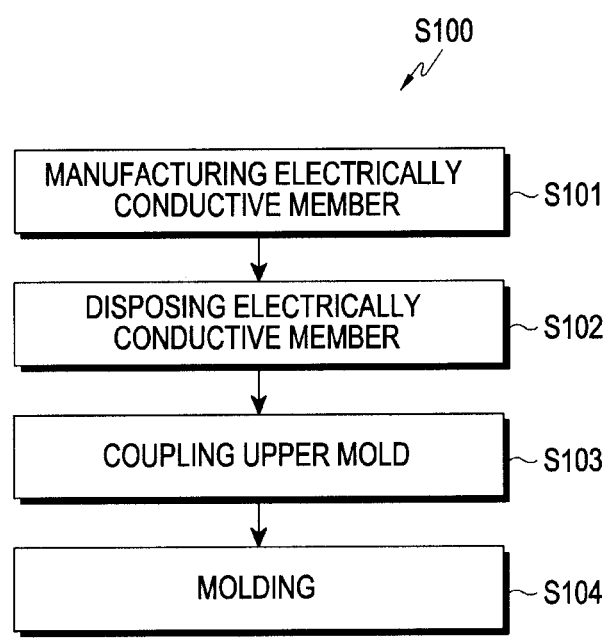
FIG. 20 is a flowchart for describing a method of manufacturing an electronic device according to certain embodiments.
Figure 21:
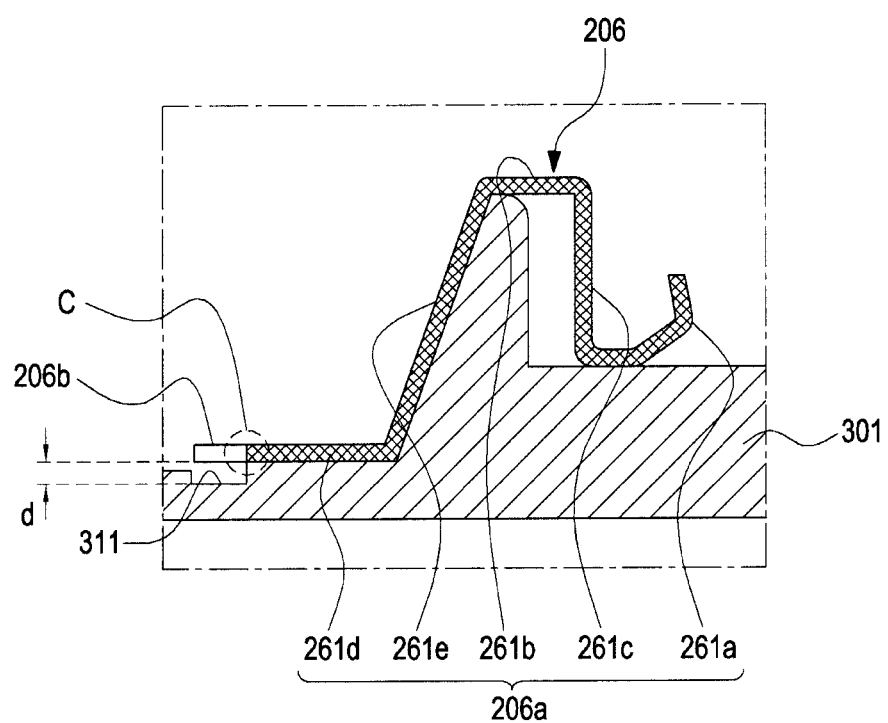
FIG. 21 is a configuration view illustrating a state in which an electrically conductive member is disposed in a lower mold in manufacturing an electronic device according to certain embodiments.
Figure 22:
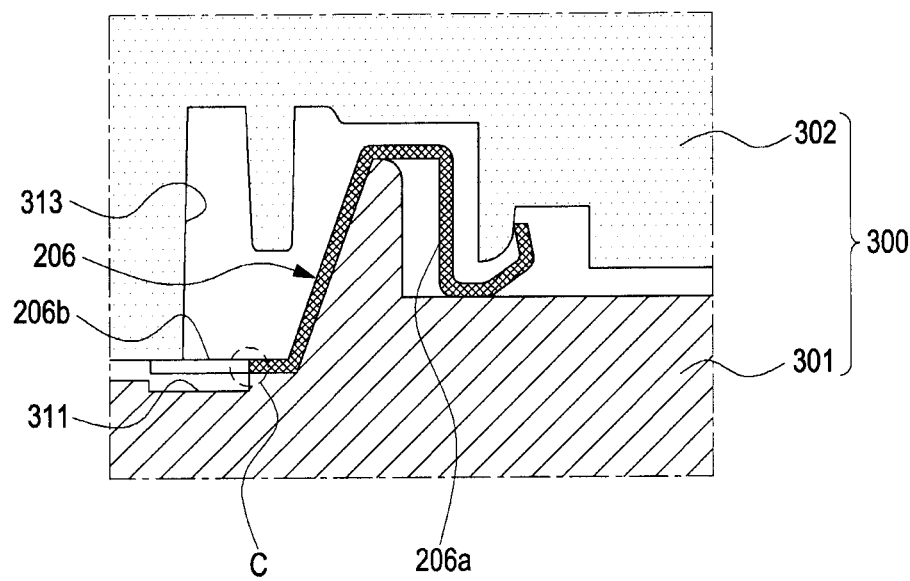
FIG. 22 and FIG. 23 are configuration views sequentially illustrating a state in which an upper mold is coupled to a lower mold in manufacturing an electronic device according to certain embodiments.
Figure 23:
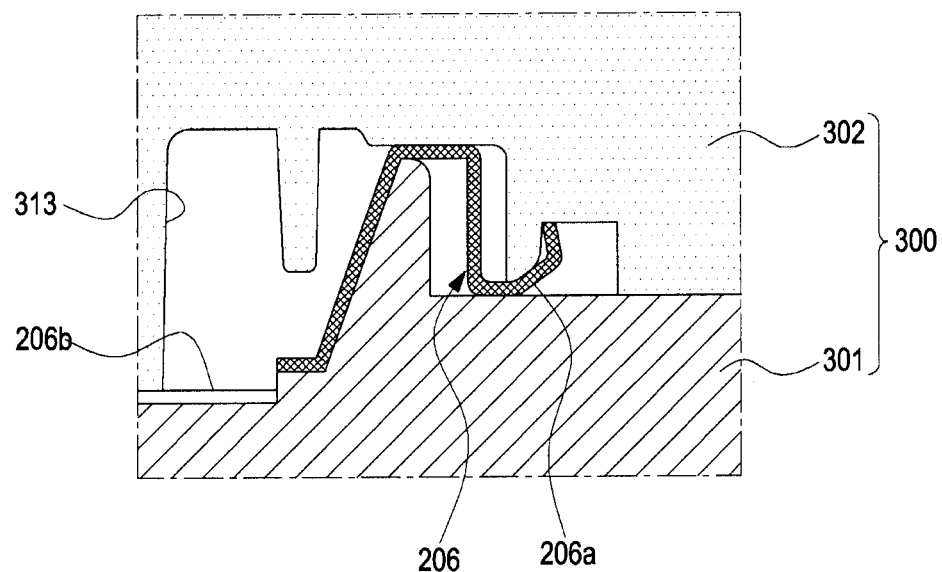
Figure 24:
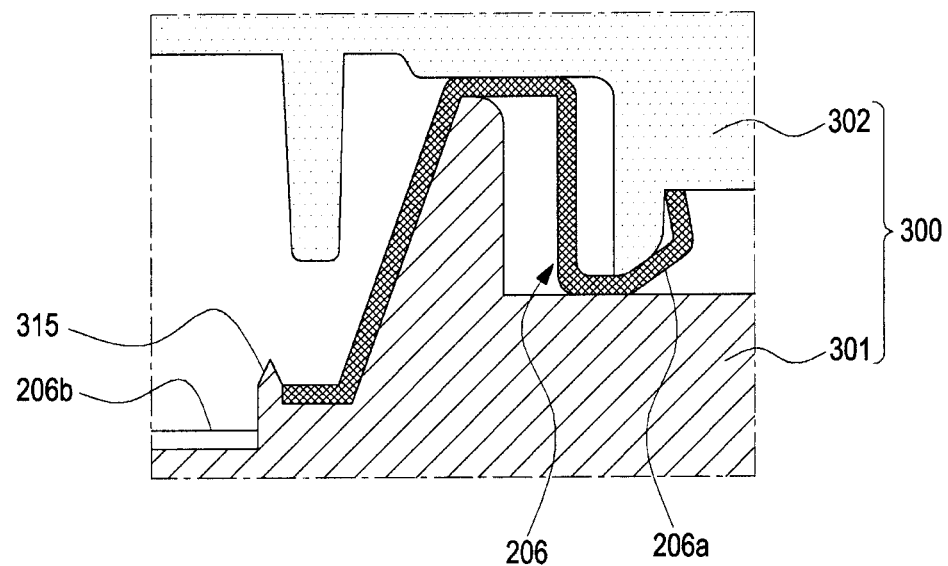
FIG. 24 is a configuration view illustrating a state in which a lower mold is modified in manufacturing an electronic device according to certain embodiments.

FIG. 20 is a flowchart for describing a method of manufacturing an electronic device (S100) according to certain embodiments. FIG. 21 is a configuration view illustrating the state in which the electrically conductive member 206 is disposed in a lower mold 301 in manufacturing an electronic device according to certain embodiments. FIGS. 22 and 23 are configuration views sequentially illustrating the state in which an upper mold 302 is coupled to the lower mold 301 in manufacturing an electronic device according to certain embodiments. FIG. 24 is a configuration view illustrating the state in which the lower mold 301 is modified in manufacturing an electronic device according to certain embodiments.

Referring to FIG. 20, the method S100 may include manufacturing an electrically conductive member (e.g., the electrically conductive member 206 of FIG. 8), placing the electrically conductive member (S102), coupling an upper mold (S103), and molding (S104).

According to certain embodiments, step S101 is an operation for fabricating an electrically conductive member by machining a metal plate. Referring to FIGS. 8 and 11, after cutting the metal plate into a designed shape, the electrically conductive member 206 (including portions which respectively correspond to the contact member 206a and the plate 206b) may be formed by bending a portion of an edge of the cut metal plate through pressing or the like. According to an embodiment, the notch(es) 269a of the connection portion C may be formed after bending the contact member 206a into a designed shape. In an embodiment, after the notches 269a and the like are formed, a finishing treatment such as polishing or plating may be performed on, for example, the corner portions of the electrically conductive member 206.

According to certain embodiments, in step S102, the fabricated electrically conductive member 206 may be disposed within a mold (e.g., the mold 300 in FIG. 22) for molding the support member 204. Referring to FIG. 21, the mold may include a lower mold 301 in which the electrically conductive member 206 is disposed, and at least a portion of each of the first portion 261a, the second portion 261b, the fourth portion 261d, and the fifth portion 261e (e.g., a part of a lower face) of the contact member 206a may be supported on the inner face of the lower mold 301. For example, as illustrated in FIG. 21, when the support member 204 is molded while the electrically conductive member 206 is in the state illustrated in FIG. 21, the lower faces of the fourth portion 261d and the fifth portion 261e may be exposed to the outer face of the support member 204.

In some embodiments, the inner face of the lower mold 301 may include a groove 311 having a predetermined depth d. The depth d of the groove 311 may be greater than the thickness of the electrically conductive member 206. For example, the electrically conductive member 206 may have a thickness of less than 0.4 mm, and the depth d of the groove 311 may be 0.4 mm or more. According to certain embodiments, when the electrically conductive member 206 is disposed in the lower mold 301, the groove 311 is disposed to correspond to the plate 206b and the edge portion of the groove 311 (e.g., the boundary between the region where the groove 311 is formed and the region where the fourth portion 261d is supported) across the connection portion C, for example, the notch(es) 269a.

According to certain embodiments, in step S103, the upper mold 302 is coupled to the lower mold 301 in the state in which the electrically conductive member 206 is disposed in the lower mold 301. Referring to FIGS. 22 and 23, in step S103, the electrically conductive member 206 may be cut and separated into the contact member 206a and the plate 206b. The upper mold 302 gradually moves downward from above the lower mold 301 and is coupled to the lower mold 301, and a structure of the inner face (hereinafter, a "pressing portion 313") of the upper mold 302 may come into contact with a portion of the electrically conductive member 206. For example, the pressing portion 313 may come into contact with a portion of the region corresponding to the plate 206b in the electrically conductive member 206 so as to press the upper face of the electrically conductive member 206.

According to certain embodiments, in the electrically conductive member 206, since a region corresponding to the fourth portion 261d is supported on the inner face of the lower mold 301, and a region corresponding to the plate 206b is positioned above the groove 311, stress may be generated in the connection portion C due to the load of the pressing portion 313. In an embodiment, since the boundary between the region corresponding to the groove 311 and the region supporting the fourth portion 261d is located across the notch(es) 269a, the maximum stress can be generated in a cross section across the notches 269a, and the electrically conductive member 206 can be cut in the cross section across the notches 269a so as to be separated into the contact member 206a and the plate 206b. In some embodiments, as illustrated in FIG. 24, the lower mold 301 may further include a protrusion 315 formed on the inner face. The protrusion 315 is positioned across the notch(es) 269a, and the top end of the protrusion 315 is sharpened, so that the electrically conductive member 206 can be cut more easily.

According to certain embodiments, after the upper mold 302 is fully coupled to the lower mold 301 (e.g., after the electrically conductive member 206 is cut), the contact member 206a is maintained in the state in which the fourth portion 261d or the like is supported on the inner face of the lower mold 301, and the plate 206b is capable of being completely seated and fixed in the groove 311. When the upper mold 302 is completely coupled to the lower mold 301, the first portion 261a is capable of at least partially coming into close contact with a portion of the inner face of the lower mold 301 or the upper mold 302. According to an embodiment, the second portion 261b may be in close contact with another portion of the inner face of the upper mold 302 on the upper face thereof, and the third portion 261c may be spaced apart from the inner face of each of the lower mold 301 and the upper mold 302. For example, after the support member 204 has been molded, each of the first portion 261a and the upper face of the second portion 261b may be at least partially exposed to the outside of the support member 204, and the third portion 261c may be substantially disposed within the support member 204.

According to certain embodiments, in step S104, molten resin is injected into the mold 300 and cured, and the support member 204 may be substantially molded through step S104. When the molten resin is injected into the mold 300 and cured, the contact member 206a may be mounted on the support member 204 in the state in which a portion of the contact member 206a (e.g., the first portion 261a or the second portion 261b) protrudes or is exposed to the outside of the support member 204 and in the state in which the remaining portion (e.g., the third portion 261c) is disposed within the support member 204. The plate 206b may be exposed on one face of the molded support member 204 (e.g., a face facing the display device 202 of FIG. 2), and depending on the designed shape of the mold 300, the support member 204 may be mounted and fixed simultaneously with the molding of the support member 204.

When such a contact member is assembled to a support member in a separate step in an electronic device, it takes a considerable amount of time to assemble, which may cause an operator to become significantly fatigued. As electronic devices are miniaturized, the time utilized for assembling the contact member and the fatigue of the operator may increase. In the electronic device manufacturing method according to certain embodiments, since the contact member is capable of being mounted on the support member through an insert injection molding step, rather than through a separate assembling step, it is possible to reduce the manufacturing time and the fatigue of an operator. In some embodiments, even if the electronic device is miniaturized, since the contact member is capable of being handled as a portion of the electrically conductive member, it is possible to reduce defects resulting from, for example, dropping the contact member during the insert injection molding step, as well as being possible to easily arrange the contact member in the mold.

As described above, according to certain embodiments disclosed herein, an electronic device may include: a housing including a first face oriented in a first direction, a second face oriented in a second direction opposite the first direction, and a side member at least partially surrounding a space between the first face and the second face; a support member accommodated in the housing and disposed such that at least a portion of a side face thereof faces an inner wall of the side member; a circuit board mounted on one face of the support member; an electrically conductive plate mounted on a remaining face of the support member; and a contact member mounted on the support member so as to electrically connect at least a portion of the side member to the circuit board.

The contact member may have an end portion located adjacent to the plate, and an end face of the end portion of the contact member located adjacent to the plate may have a width or thickness smaller than a width or thickness of another portion of the contact member.

According to certain embodiments, the one end portion of the contact member located adjacent to the plate may be disposed on the support member at a position stepped relative to the plate.

According to certain embodiments, the face of the one end portion of the contact member may include a cut face formed by cutting a portion between the plate and the contact member.

According to certain embodiments, the one end of the contact member may be exposed to the remaining face of the support member at a position adjacent to the plate.

According to certain embodiments, the contact member may include: a bent portion protruded to a side face of the support member so as to come into contact with the inner wall of the side member; a contact portion exposed to the one face of the support member so as to come into electrical contact with the circuit board; a dummy portion exposed to the remaining face of the support member; and a connection portion disposed within the support member, and including a first connection portion configured to connect the bent portion to the contact portion, and a second connection portion configured to connect the contact portion to the dummy portion.

According to certain embodiments disclosed herein, an electronic device may include: a housing including a first face oriented in a first direction, a second face oriented in a second direction opposite the first direction, and a side member at least partially surrounding a space between the first face and the second face; a support member accommodated in the housing and disposed such that at least a portion of a side face thereof faces an inner wall of the side member; a circuit board mounted on one face of the support member; an electrically conductive plate mounted on a remaining face of the support member; and a contact member including a first portion protruded to the side face of the support member so as to come into contact with the inner wall of the side member, and a second portion exposed to one face of the support member so as to come into electrical contact with the circuit board.

The contact member may further include a third portion configured to electrically connect the first portion to the second portion and that is disposed within the support member.

According to certain embodiments, the contact member may further include: a fourth portion located on the support member to be adjacent to the plate; and a fifth portion configured to connect the fourth portion to the second portion.

According to certain embodiments, the fourth portion may include a cut face formed by cutting a portion between the plate and the contact member, and the cut face may have a width or thickness smaller than the width or thickness of another portion of the contact member.

According to certain embodiments, the fourth portion may be disposed on the support member at a position stepped relative to the plate.

According to certain embodiments, the first portion may extend at least partially obliquely with respect to the side face of the support member.

According to certain embodiments, the electronic device may further include a communication module that is mounted on the circuit board, and the contact member may be electrically connected to the communication module.

According to certain embodiments, at least a portion of the side member may include an electrically conductive material, and the electrically conductive material of the side member may be electrically connected to the communication module via the contact member.

According to certain embodiments, the electronic device may further include a display device disposed so as to form the first face of the housing, and the plate may be disposed to face an inner face of the display device.

According to certain embodiments, the electronic device may further include a cover member disposed so as to form the second face of the housing, and the circuit board may be disposed to face the cover member.

According to certain embodiments, the electronic device may further include a C-clip mounted on the circuit board, and the C-clip may come into electrical contact with the second portion of the contact member.

According to certain embodiments disclosed herein, an electronic device manufacturing method may include: manufacturing an electrically conductive member including a combination of a plate and a contact member extending from the plate; disposing the electrically conductive member in a lower mold in a mold, which is formed by coupling the lower mold and an upper mold to each other; coupling the upper mold to the lower mold after disposing the electrically conductive member; and molding a support member by injecting a molten resin into the mold and curing the molten resin.

At least a portion of the contact member may be disposed within the molded support member.

According to certain embodiments, in the electrically conductive member, a connection portion of the plate and the contact member may have a thickness or width smaller than the thickness or width of another portion of the contact member.

According to certain embodiments, the upper mold may cut the connection portion of the plate and the contact portion while being coupled to the lower mold.

According to certain embodiments, a cut face formed by cutting the connection portion may have a width or thickness smaller than the width or thickness of another portion of the contact member.

According to certain embodiments, the support member may be molded in a state in which a portion of the contact member protrudes to a side face thereof and another portion is exposed to one face thereof.

While the present disclosure has been shown and described with reference to certain embodiments thereof, it will be understood by those skilled in the art that various changes in form and details may be made therein without departing from the present disclosure as defined by the appended claims.

What is claimed is:

1. An electronic device, comprising:
 a housing including a first face oriented in a first direction, a second face oriented in a second direction opposite the first direction, and a side member at least partially surrounding a space defined between the first face and the second face;
 a support member disposed within the housing such that at least a portion of a side face of the support member is oriented towards an inner wall of the side member;
 a circuit board mounted on one face of the support member;
 an electrically conductive plate mounted on a second face of the support member; and
 a contact member mounted on the support member so as to electrically couple at least a portion of the side member to the circuit board,
 wherein the contact member includes an end portion disposed adjacent to the plate at a position stepped relative to the plate, and an end face of the end portion includes a width smaller than a width of another portion of the contact member different than the end portion, and
 wherein a mid portion of the contact member penetrates through the support member, such that all surfaces of the mid portion physically contact interior surfaces of the support member.

2. The electronic device of claim 1, wherein the end face of the end portion includes at least one cut notch disposed between the plate and the contact member.

3. The electronic device of claim 1, wherein the end portion of the contact member is exposed to the second face of the support member adjacent to the plate.

4. The electronic device of claim 1, wherein the contact member includes:
 a bent portion protruding towards a side face of the support member and contacting the inner wall of the side member;
 a contact portion exposed to the one face of the support member in electrical contact with the circuit board;
 a dummy portion exposed to the remaining face of the support member; and
 a connection portion penetrating through the support member, the connection portion including a first connection portion configured to connect the bent portion to the contact portion, and a second connection portion configured to connect the contact portion to the dummy portion.

5. The electronic device of claim 1, wherein the contact member is pressed against the side member to electrically couple the side member to the circuit board, and
 wherein the mid portion is fixed within the support member as to be unmoved when the contact member is pressed against the side member.

6. An electronic device, comprising:
 a housing including a first face oriented in a first direction, a second face oriented in a second direction opposite the first direction, and a side member at least partially surrounding a space defined between the first face and the second face;
 a support member disposed within the housing such that at least a portion of a side face of the support member is oriented towards an inner wall of the side member;
 a circuit board mounted on one face of the support member;
 an electrically conductive plate mounted on a second face of the support member; and
 a contact member including a first portion protruding towards the side face of the support member and contacting the inner wall of the side member, a second portion exposed to one face of the support member and electrically contacting the circuit board, a third portion electrically connecting the first portion to the second portion, and a fourth portion disposed on the support member and adjacent to the plate,
 wherein the third portion penetrates through the support member, such that all surfaces of the third portion physically contact to interior surfaces of the support member, and
 wherein the fourth portion is disposed on the support member at a position stepped relative to the plate.

7. The electronic device of claim 6, wherein the contact member further includes:
 a fifth portion connecting the fourth portion to the second portion.

8. The electronic device of claim 7, wherein the fourth portion includes a cut face including a portion disposed between the plate and the contact member, and
the cut face has a width smaller than a width of another portion of the contact member.

9. The electronic device of claim 6, wherein the first portion at least partially extends obliquely relative to the side face of the support member.

10. The electronic device of claim 6, further comprising:
a communication module mounted on the circuit board,
wherein the contact member is electrically connected to the communication module.

11. The electronic device of claim 10, wherein at least a portion of the side member includes an electrically conductive material, and
the electrically conductive material is electrically connected to the communication module via the contact member.

12. The electronic device of claim 6, further comprising:
a display device forming the first face of the housing,
wherein the plate is disposed such that the plate is oriented towards an inner face of the display device.

13. The electronic device of claim 6, further comprising:
a cover member forming the second face of the housing,
wherein the circuit board is disposed facing the cover member.

14. The electronic device of claim 6, further comprising:
a C-clip mounted on the circuit board,
wherein the C-clip is in electrical contact with the second portion of the contact member.

15. The electronic device of claim 6, wherein the contact member is pressed against the side member to electrically couple the side member to the circuit board, and
wherein the mid portion is fixed within the support member as to be unmoved when the contact member is pressed against the side member.

* * * * *